Patented May 12, 1936

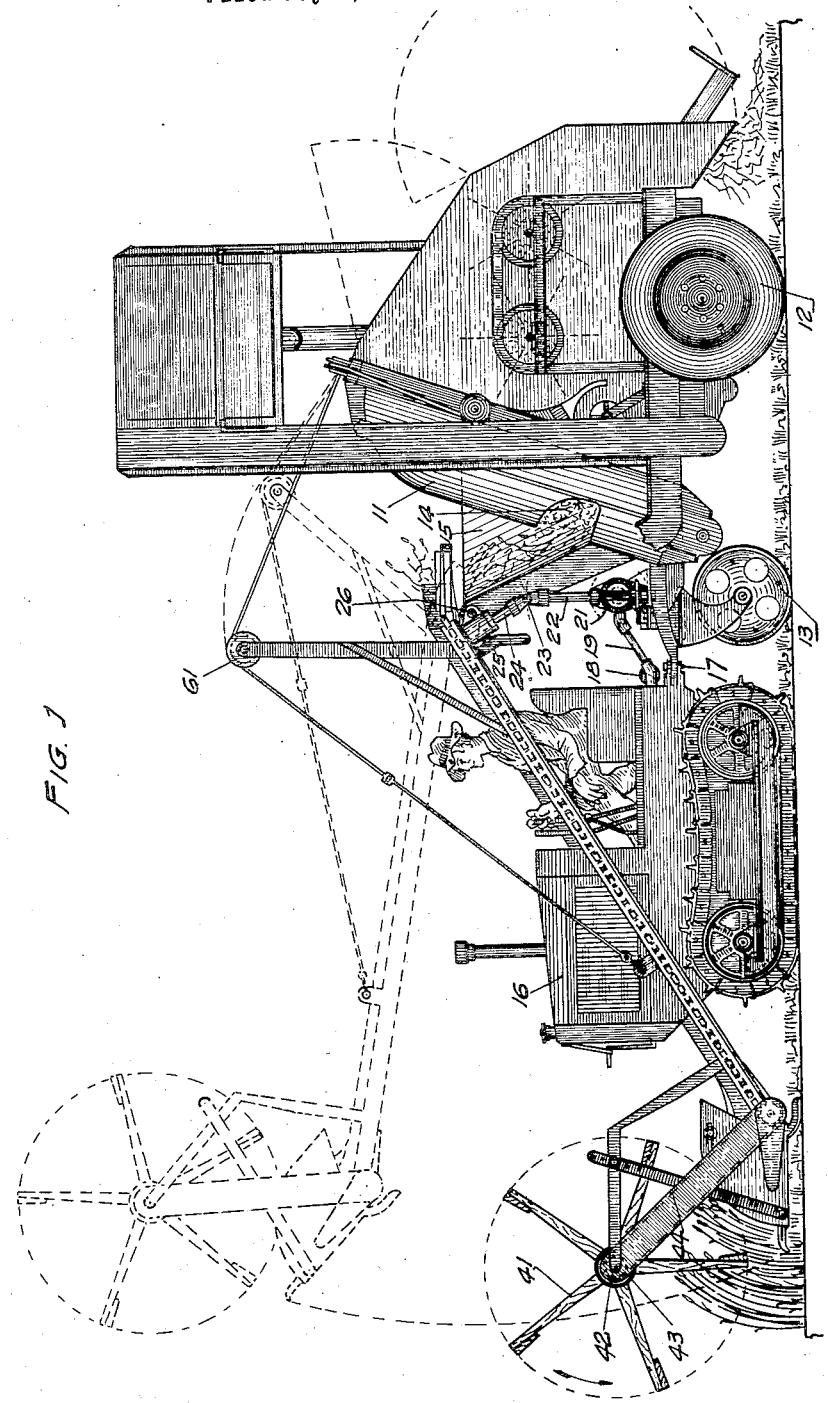

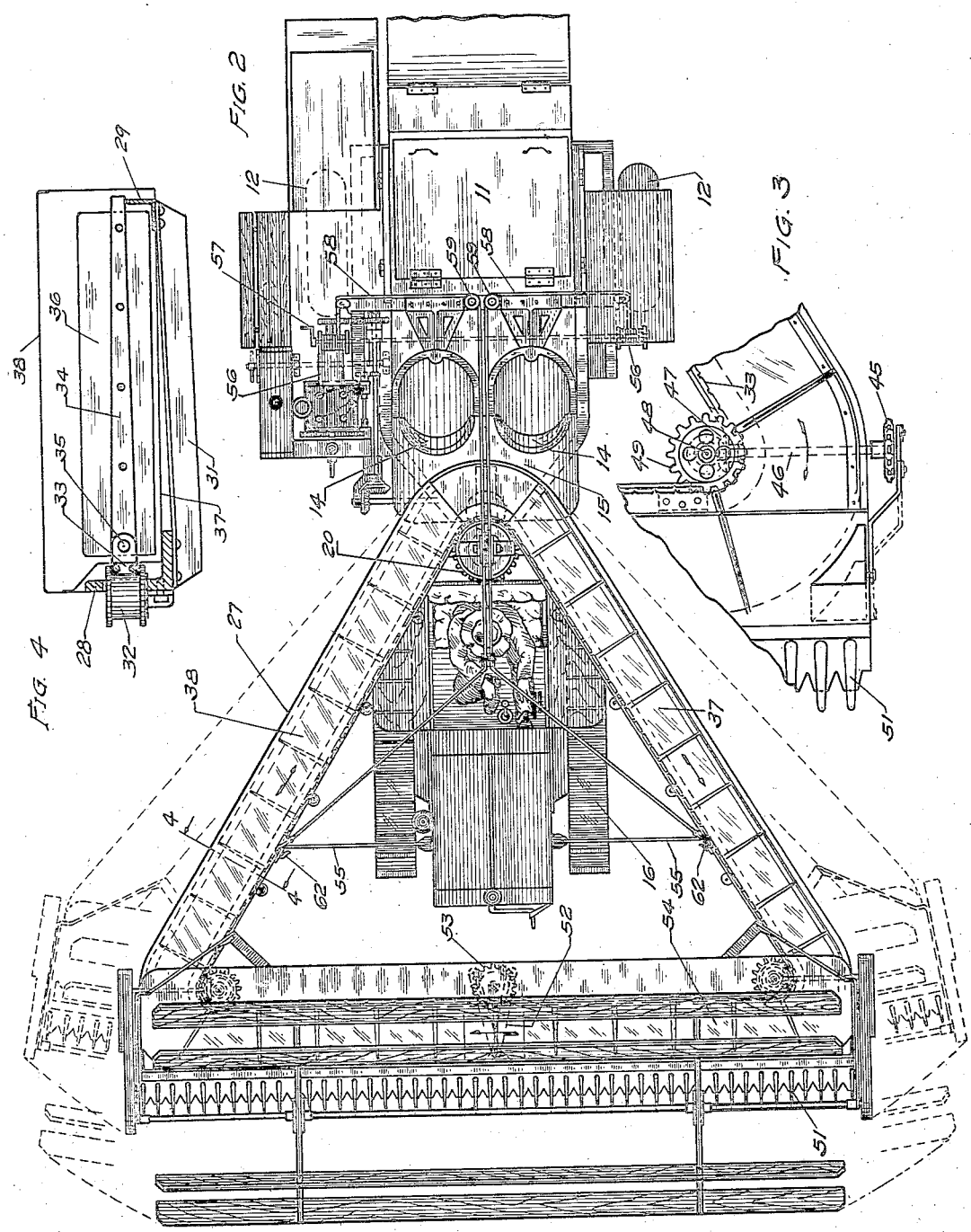

2,040,605

UNITED STATES PATENT OFFICE 2,040,605

THRESHING MACHINE

Arthur J. Harder, Chicago, Ill.

Application May 9, 1935, Serial No. 20,539

5 Claims. (Cl. 56—21)

My invention relates to features of betterment and advantage, both structural and functional, in combined harvesting and threshing machines, and it concerns more particularly the means for feeding or advancing the cut grain from the cutter-blades or bars into the separator or thresher.

A purpose of the invention is to provide a structure of this kind adapted for association with a tractor detachably connected to the machine, the cut grain feeder referred to being so mounted on the appliance that it may be raised to permit the tractor to be disconnected from the machine and used for other purposes, the feeder being in normal, operative position when it is lowered.

A salient feature of the invention is the employment of a grain feeder of this type in a machine of the character referred to which is so coupled to the tractor that as the latter is turned in steering the grain feeder and the associated cutter bars will be swung automatically in the same direction, thus facilitating the steering action of the appliance as a whole.

Various other objects and aims of the invention and the manner of their attainment will become apparent to those skilled in the art from the following detailed description of a present preferred embodiment of the invention illustrated in the accompanying drawings, forming a part of this specification, and throughout the several views of which like reference numerals have been employed to designate the same structural parts.

In these drawings:—

Figure 1 is a side elevation of a multiple centrifugal harvester equipped with the novel and improved cut-grain feeding appliance;

Figure 2 is a plan view of the same;

Figure 3 is a fragmentary, detail view of a portion of the endless conveyor and the associated parts; and Figure 4 is an enlarged vertical cross-section through the conveyor on line 4—4 of Figure 2.

Referring to these drawings, it will be perceived that the appliance includes a multiple, centrifugal threshing-machine, characterized as a whole 11, mounted to travel on three carrying-wheels 12, 12, 13, such machine having entrance mouths or admission openings 14 for the reception of the cut grain and to which entrances the grain is delivered down a spout or guide 15.

A caterpillar or other type of tractor 16 is detachably connected at 17 to the front end of the machine, and the drive-shaft 18 of the tractor is disconnectably joined by a shaft 19 and gearing 21 to an upright shaft 22 which, through a universal-joint 23, drives a forwardly upwardly inclined shaft 24 having a slip-joint driving connection with the shaft or hub of a main sprocket-wheel 20, the bearing 25 for such shaft or hub being hinged at 26 at the upper front portion of the frame of the machine.

The mechanism includes also an inclined, triangular-shaped endless-conveyor, designated as a whole 27, each of the two downwardly-diverging sections of which comprises an inner angle-bar 28 and a smaller outer associated angle-bar 29 carried on the outer ends of supporting arms 31 mounted on the lower flange of the companion angle-bar 28.

At various points along these bars 28, the latter are apertured to receive anti-friction idler-pulleys 32, 32 appropriately mounted on such bars and projecting outwardly through their apertures to cooperate with an endless conveyor-chain 33 to the links of which at spaced points propeller-arms 34 are secured at 35, the free ends of such arms riding or sliding on the tops of the smaller angle-bars 29, each such arm carrying a rubber, fabric or other suitable blade 36.

Such two upwardly converging sections of the conveyor structure are provided with floors 37 and one section only has a sheet-metal cover 38, the specified floors or bottoms being omitted at the top of the chute 15 to allow the cut grain when it reaches such point in its ascent to fall into the latter.

It is to be understood that the power-driven sprocket-wheel 20 is in mesh with the conveyor-chain 33 and that it effects the travel of such chain.

At its lower end the frame of this inclined or upwardly-sloping structure is fitted with the customary reel 41, both ends of the shaft 42 of which are fitted with sprocket-wheels 43 each of which is revolved by its encased or covered sprocket-chain 44 which extends around its lower driving sprocket-wheel 45 on a shaft 46 connected by bevel-gearing 47 to an upright shaft 48 equipped with a sprocket-wheel 49 in mesh with and rotated by the conveyor-chain 33 (see Fig. 3).

It will be readily understood that the reel is rotated from both ends by the duplicate driving or operating means described.

The appliance includes also a cutter-bar 51 reciprocated by any approved means, such as a lever 52, rocked by power received from a sprocket-wheel 53 in mesh with the endless conveyor-chain 33 at about the middle of its horizontal stretch.

Back of the cutter-bar and across the lower front end of the structure is a horizontal plate or floor 54 onto which the cut grain falls and along which it is pushed by the travelling blades 36.

As shown in Figure 2, the two sides of the tractor are joined, in a manner allowing manual disconnection, to the corresponding inclined side sections of the conveyor frame by a pair of rods 55, 55.

In order to allow the conveyor to be swung upwardly to permit the tractor to be disconnected from the threshing machine and to be run out forwardly for other service, or to allow it to be backed into place and operatively joined to the thresher, two winches 56, 56 (see Fig. 2) on the threshing machine are adapted to be conjointly or simultaneously rotated by a handle 57 for the winding thereon or unwinding therefrom of two cables 58, 58 which pass around suitably-supported pulleys or sheaves 59, 59 and 61, 61 and they are connected at their ends at 62, 62 to the two side members of the conveyor-frame.

Assuming that the parts of the mechanism are all connected together, as shown in full lines in the drawings, the tractor when in action will advance the whole machine in a manner well understood, and its power will at the same time be employed for operating the threshing-machine and for actuating the endless conveyor, the chain of the latter and its blades traveling idly down one side of the conveyor-frame as indicated by an arrow in Figure 1, across the front of the appliance where it pushes the cut grain to the far side of the machine as viewed in Figure 2, and then up the other side of the conveyor, as shown by another arrow, the grain when it arrives at the top of the conveyor falling into the chute and into the mouths of the duplex threshing machine.

When the tractor is turned to guide the trailing threshing-machine, the conveyor and its associated cutting mechanism turn with it in similar manner owing to the side connections 55, 55.

When it is desired to use the tractor for other purposes, the rods 55, 55 are manually disconnected from the tractor and the handle 57 is turned to wind the two cables on the winches, thereby rocking the combined cutting mechanism and conveyor up into the elevated position shown in dotted lines in Figure 1, whereupon the tractor, after it has been disconnected from the threshing-machine, may be driven out for service in some other relation.

When the threshing-machine is to be used again the tractor is backed into place and operatively joined to the threshing-machine, whereupon the cables are unwound from the winches, the conveying and cutting mechanism swinging down to operative position, and then the cross connections 55 are put in place to tie the parts of the appliance together in the manner well understood.

From an understanding of the foregoing description of the structural characteristics of the mechanism and its mode of functioning the attainment of the specified objects of the invention will be perceived to have been accomplished.

The invention is not limited and restricted to the precise and exact details of construction illustrated and described and these may be modified in more or less minor or major degrees without departure from the heart and essence of the invention and without the loss or sacrifice of any of its material or substantial benefits or advantages.

I claim:

1. In an appliance of the character described, the combination of a threshing-machine, a combined substantially-horizontal grain-cutter and an upwardly rearwardly inclined endless-conveyor mounted at its upper rear end on the front portion of said threshing-machine for lateral turning and swinging of said cutter-conveyor with relation to said threshing-machine, means to connect a tractor, adapted to be coupled to the front of said threshing-machine, to said cutter-conveyor, whereby steering turning of said tractor when coupled to the threshing-machine correspondingly turns said cutter-conveyor, and means to operate said conveyor and cutter.

2. The structure presented in claim 1 in which said conveyor is of general triangular shape with an apex at the upper rear end and with a transverse straight side at its lower end back of said cutter.

3. The structure presented in claim 1 in which said conveyor is of general isosceles-triangle-shape with its base at its lower front end and its apex at its upper end, said conveyor including an endless sprocket-chain, a sprocket-wheel engaging and driving said chain at said apex, and means operated by said conveyor-chain to actuate said cutter.

4. The structure presented in claim 1, in combination with means to rock said cutter-conveyor upwardly and downwardly about its rear upper end sufficiently to permit the removal and replacement of the tractor.

5. In an appliance of the character described, the combination with a threshing-machine, a combined substantially-horizontal grain-cutter and an upwardly rearwardly inclined endless conveyor structure rockingly mounted at its upper rear end on the front portion of said threshing-machine for upward and downward turning with relation thereto, means to connect a tractor, adapted to be coupled to the front of said threshing-machine, to said cutter-conveyor to operate the same when the tractor is so coupled to the threshing-machine, and means to raise and lower said cutter-conveyor about its mounting to permit the tractor to be coupled to or to be uncoupled from the threshing-machine.

ARTHUR J. HARDER.